US012315351B2

(12) United States Patent
Shanmugavelu et al.

(10) Patent No.: US 12,315,351 B2
(45) Date of Patent: May 27, 2025

(54) SMART SURVEILLANCE THROUGH DYNAMIC THREAT-LEVEL INDEXING

(71) Applicant: Honeywell International Inc., Charlotte, NC (US)

(72) Inventors: Pradeep Kumar Shanmugavelu, Madurai (IN); Vivek Ramachandran, Bangalore (IN); Sivakumar Mahadevan, TamilNadu (IN); Srinivas C, TamilNadu (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 155 days.

(21) Appl. No.: 17/942,713

(22) Filed: Sep. 12, 2022

(65) Prior Publication Data

US 2024/0087438 A1 Mar. 14, 2024

(51) Int. Cl.
G08B 21/02 (2006.01)
G06F 3/14 (2006.01)

(52) U.S. Cl.
CPC .............. G08B 21/02 (2013.01); *G06F 3/14* (2013.01)

(58) Field of Classification Search
CPC .................................................. G08B 21/02
USPC ...................................................... 340/691.6
See application file for complete search history.

(56) References Cited

U.S. PATENT DOCUMENTS

| | | | | |
|---|---|---|---|---|
| 2012/0307067 A1* | 12/2012 | Chen | ...................... | H04N 7/181 |
| | | | | 348/E7.085 |
| 2015/0235238 A1* | 8/2015 | Babinowich | ....... | G06Q 30/0204 |
| | | | | 705/7.31 |
| 2018/0053401 A1* | 2/2018 | Martin | ................... | H04M 11/04 |
| 2018/0199179 A1* | 7/2018 | Rauner | .................. | G08B 25/10 |
| 2019/0088106 A1* | 3/2019 | Grundstrom | ............ | H04W 4/90 |
| 2021/0216928 A1* | 7/2021 | O'Toole | .................. | G06F 16/29 |
| 2021/0312351 A1* | 10/2021 | Pourmohammad | ... | G06F 16/906 |
| 2022/0210609 A1* | 6/2022 | Koval | .................. | G06V 20/182 |

FOREIGN PATENT DOCUMENTS

| | | |
|---|---|---|
| CN | 109636132 B | 3/2021 |
| CN | 113609656 A | 11/2021 |

OTHER PUBLICATIONS

Elvas et al, "Data-Driven Approach for Incident Management in a Smart City," Applied Sciences, vol. 10, 18 pages, 2020.
Peng et al, "U-Safety: Urban Safety Analysis in a Smart City," IEEE ICC SAC Symposium Big Date Networking Track, 6 pages, 2017.

* cited by examiner

Primary Examiner — Kerri L McNally
(74) Attorney, Agent, or Firm — Seager, Tufte & Wickhem, LLP (57) ABSTRACT

Static data that represents one or more static contributing factors to a dynamic threat-level index is received for a corresponding local region and live data that represents one or more dynamic contributing factors to the dynamic threat-level index for the corresponding local region is repeatedly received. An updated dynamic threat-level index for the corresponding local region is repeatedly determined based at least in part on a previously determined updated dynamic threat-level index for the corresponding local region, at least some of the received static data for the corresponding local region, and at least some of the received live data for the corresponding local region. A dashboard is displayed that dynamically shows the updated dynamic threat-level index for each of at least some of the plurality of local regions.

17 Claims, 12 Drawing Sheets

SMART SURVEILLANCE THROUGH DYNAMIC THREAT-LEVEL INDEXING

TECHNICAL FIELD

The present disclosure relates generally to surveillance systems. More particularly, the present disclosure relates to surveillance systems that dynamically identify threat-levels across a surveilled area.

BACKGROUND

Many cities include surveillance systems that are deployed throughout the city. Surveillance systems may include a variety of surveillance system assets, including surveillance cameras and sensors, and live assets such as police officers, firemen and the like. In many cases, there may not be sufficient surveillance assets to deploy within every area and location within the city, so choices must be made as to where and how to deploy the available surveillance assets. What would be desirable is a way to improve surveillance within a city by identifying a dynamic threat level for each part of the city, which can then be used in determining how to deploy various surveillance assets for optimal performance.

SUMMARY

The present disclosure relates to surveillance systems and particularly to surveillance systems that dynamically identify threat-levels across a surveilled area. An example may be found in a method for improving surveillance within a city, wherein the city includes a plurality of local regions. The illustrative method includes, for each local region of the plurality of regions, receiving static data that represents one or more static contributing factors to a dynamic threat-level index for the corresponding local region and repeatedly receiving live data that represents one or more dynamic contributing factors to the dynamic threat-level index for the corresponding local region. The illustrative method includes repeatedly determining an updated dynamic threat-level index for the corresponding local region, wherein the updated dynamic threat-level index for the corresponding local region is based at least in part on a previously determined updated dynamic threat-level index for the corresponding local region, at least some of the received static data for the corresponding local region, and at least some of the received live data for the corresponding local region. The illustrative method further includes displaying a dashboard that dynamically shows the updated dynamic threat-level index for each of at least some of the plurality of local regions.

In some cases, the static data may include, for example, one or more of demographic data for the corresponding local region, literacy data for the corresponding local region, migrant data for the corresponding local region, population density data for the corresponding local region, employment data for the corresponding local region, income data for the corresponding local region, historical crime rate data for the corresponding local region, traffic law compliance data for the corresponding local region, traffic incident data for the corresponding local region, average traffic density data for the corresponding local region, surveillance coverage data that provides a measure of surveillance coverage of the corresponding local region, pandemic/epidemic status for the corresponding local region, and/or any other useful static data that has a correlation with a threat level in the corresponding local region. In some cases, the dynamic data may include, for example, one or more of traffic data for the corresponding local region, law enforcement asset data that provides a measure of law enforcement assets currently assigned to the corresponding local region, event data identifying one or more events currently identified in the corresponding local region, social media data relevant to the corresponding local region, environmental condition data identifying one or more environmental conditions currently detected in the corresponding local region, and/or any other useful dynamic data that has a correlation with a threat level in the corresponding local region.

Another example may be found in a method for monitoring activity within a city that is divided into a plurality of local regions. The illustrative method includes, for each local region of the plurality of local regions, receiving static data that represents one or more static contributing factors to one or more city performance indices for the corresponding local region, wherein the static data is updated at a rate of once per month or less often, and repeatedly receiving live data that represents one or more dynamic contributing factors to the one or more of the city performance indices for the corresponding local region, wherein the live data is updated at a rate of once per day or more often. The method includes repeatedly determining updated values for each of the one or more of the city performance indices for the corresponding local region based at least in part on at least some of the static data and at least some of the live data. The illustrative method includes displaying on a display the updated values for one or more of the city performance indices for at least some of the plurality of local regions.

Another example may be found in a system for improving surveillance within a city or other region. The illustrative system includes an input/output block and a controller that is operatively coupled to the input/output block. The controller is configured to receive via the input/output block static data that represents one or more static contributing factors to a dynamic threat-level index for at least part of the city, wherein the static data is updated at a rate of once per month or less often. The controller is configured to repeatedly receive live data that represents one or more dynamic contributing factors to the dynamic threat-level index, wherein the live data is updated at a rate of once per day or more often. The controller is configured to repeatedly determine an updated dynamic threat-level index, wherein the updated dynamic threat-level index is based at least in part upon at least some of the received static data and at some of the received live data. The controller is configured to output via the input/output block a recommendation to allocate a plurality of surveillance assets to a particular region of the city in response to an elevated updated dynamic threat-level index.

The preceding summary is provided to facilitate an understanding of some of the innovative features unique to the present disclosure and is not intended to be a full description. A full appreciation of the disclosure can be gained by taking the entire specification, claims, figures, and abstract as a whole.

BRIEF DESCRIPTION OF THE FIGURES

The disclosure may be more completely understood in consideration of the following description of various examples in connection with the accompanying drawings, in which.

While the disclosure is amenable to various modifications and alternative forms, specifics thereof have been shown by way of example in the drawings and will be described in detail. It should be understood, however, that the intention is not to limit the disclosure to the particular examples described. On the contrary, the intention is to cover all modifications, equivalents, and alternatives falling within the spirit and scope of the disclosure.

DESCRIPTION

The following description should be read with reference to the drawings, in which like elements in different drawings are numbered in like fashion. The drawings, which are not necessarily to scale, depict examples that are not intended to limit the scope of the disclosure. Although examples are illustrated for the various elements, those skilled in the art will recognize that many of the examples provided have suitable alternatives that may be utilized.

All numbers are herein assumed to be modified by the term "about", unless the content clearly dictates otherwise. The recitation of numerical ranges by endpoints includes all numbers subsumed within that range (e.g., 1 to 5 includes 1, 1.5, 2, 2.75, 3, 3.80, 4, and 5).

As used in this specification and the appended claims, the singular forms "a", "an", and "the" include the plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic may be applied to other embodiments whether or not explicitly described unless clearly stated to the contrary.

Figure 1:
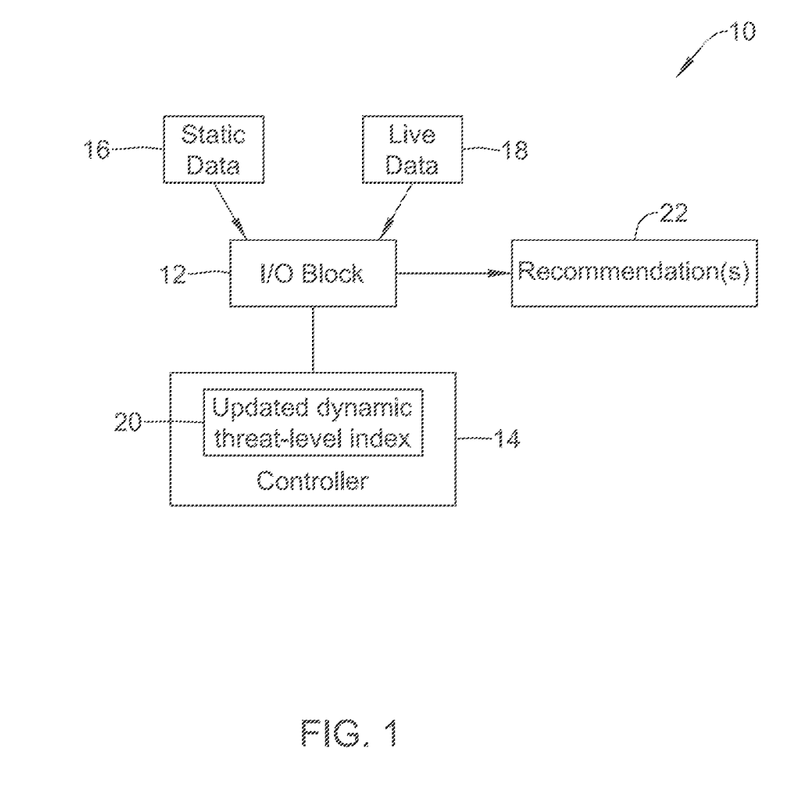
FIG. 1 is a schematic block diagram of an illustrative system for improving surveillance within a city or other region.

FIG. 1 is a schematic block diagram of an illustrative system 10 for improving surveillance within a city or other region. The city may be divided into a number of particular regions. In some cases, the city may be divided into a number of local regions. The illustrative system 10 includes an input/output block 12 and a controller 14 that is operably coupled with the input/output block 12. The controller 14 is configured to receive static data 16 via the input/output block 12. The static data 16 may include or represent one or more static contributing factors to a dynamic threat-level index for at least part of the city. The static data 16 may be updated at a rate of once per month, or less, for example. The static data 16 may include one or more of demographic data for the corresponding local region, literacy data for the corresponding local region, migrant data for the corresponding local region, population density data for the corresponding local region, employment data for the corresponding local region, income data for the corresponding local region, historical crime rate data for the corresponding local region, traffic law compliance data for the corresponding local region, traffic incident data for the corresponding local region, average traffic density data for the corresponding local region, surveillance coverage data that provides a measure of surveillance coverage of the corresponding local region, pandemic/epidemic status for the corresponding local region, and/or any other useful static data that has a correlation with a threat level in the corresponding local region.

The controller 14 is also configured to repeatedly receive live data 18 via the input/output block 12. The live data 18 represents one or more dynamic contributing factors to the dynamic threat-level index. The live data may be updated at a rate of once per day or more often. In some cases, some or all of the live data may be real or near real time data. In some case, some of all of the live data may be updated at a rate of once per second, once per minute, once per hour, once per day or at any other suitable rate. The live data 18 may include one or more of weather data for the corresponding local region, traffic data for the corresponding local region, law enforcement asset data that provides a measure of law enforcement assets currently assigned to the corresponding local region, social media data relevant to the corresponding local region, event data identifying one or more events currently identified in the corresponding local region (e.g. a crowd gathering, shouting identified, gun shots identified, a car accident identified, a fire identified, traffic congestion identified, a stalled vehicle identified, a train derailment identified and/or any other event), environmental condition data identifying one or more environmental conditions (e.g. smoke identified, street lights not working, traffic lights not working, heavy rain identified, icy conditions identified, a chemical leak identified and/or any other environmental condition) currently identified in the corresponding local region, and/or any other useful dynamic data that has a correlation with a threat level in the corresponding local region.

The controller 14 is configured to repeatedly determine an updated dynamic threat-level index 20, wherein the updated dynamic threat-level index 20 may be based at least in part upon at least some of the received static data 16 and at some of the received live data 18. The dynamic threat-level index 20 may be updated at a rate of once per day or more often. In some cases, the dynamic threat-level index 20 may be updated in real or near real time data. In some case, the dynamic threat-level index 20 may be updated at a rate of once per second, once per minute, once per hour, once per day or at any other suitable rate.

In some cases, the updated dynamic threat-level index 20 may additionally or alternatively be based at least in part upon one or more of an updated crime safety index, an updated traffic safety index or an updated health safety index, which may each be based at least in part on at least some of the received static data for the corresponding local region and at least some of the received dynamic data for the corresponding local region. For example, the crime safety index, or the updated crime safety index may be based at least in part upon one or more of a wealth index (average earnings per person), unemployment (percentage of unemployed people, a lack of surveillance (percentage of area that is covered with video surveillance), a literacy rate, a sex ratio (relative number of males and females), and a total number of migrants. The traffic safety index, or the updated traffic safety index, may be based upon one or more of traffic rule compliance and/or number of traffic incidents, an average traffic density, and law enforcement coverage (ability of the traffic police to cover an area). The health safety index, or the updated health safety index, may be based at least in part upon one or more of air pollution, weather, and occurrences of pandemics or epidemics. These are just examples.

In some cases, the controller 14 is configured to output one or more recommendation(s) 22 via the input/output block 12 to allocate a plurality of surveillance assets to a particular region of the city in response to an elevated updated dynamic threat-level index 20. In some cases, the recommendation(s) 22 may include a suggestion to add additional surveillance assets to one or more of the local regions that have an elevated value for the updated dynamic threat-level index 20. The additional surveillance assets may include one or more surveillance cameras, for example. The recommendation(s) 22 may include a suggestion to schedule additional law enforcement assets to one or more of the local regions that have an elevated value for the updated dynamic threat-level index 20.

Figure 2:
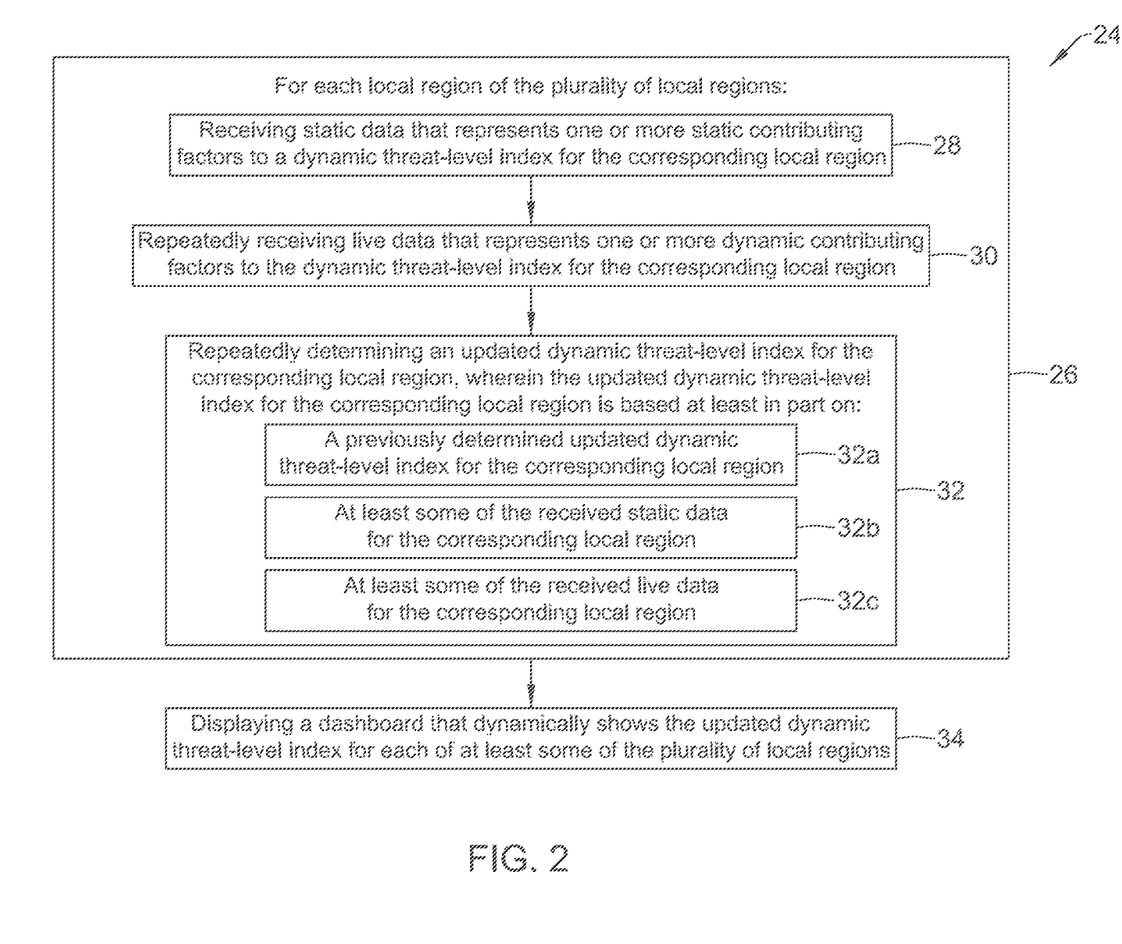
FIG. 2 is a flow diagram showing an illustrative method for improving surveillance within a city.

FIG. 2 is a flow diagram showing an illustrative method 24 for improving surveillance within a city that includes a plurality of local regions. The illustrative method 24 includes carrying out a number of steps for each local region of the plurality of regions, as indicated at block 26. The number of steps for each local region include receiving static data that represents one or more static contributing factors to a dynamic threat-level index for the corresponding local region, as indicated at block 28. The static data 16 may be updated at a rate of once per month, once per year, or less, for example. The number of steps for each local region further include repeatedly receiving live data that represents one or more dynamic contributing factors to the dynamic threat-level index for the corresponding local region, as indicated at block 30. The live data may be updated at a rate of once per day or more often. In some cases, some or all of the live data may be real or near real time data. In some case, some of all of the live data may be updated at a rate of once per second, once per minute, once per hour, once per day or at any other suitable rate.

The number of steps for each local region further include repeatedly determining an updated dynamic threat-level index for the corresponding local region, as indicated at block 32. The dynamic threat-level index may be updated at a rate of once per day or more often. In some cases, the dynamic threat-level index may be updated in real or near real time data. In some case, the dynamic threat-level index may be updated at a rate of once per second, once per minute, once per hour, once per day or at any other suitable rate. In the example shown, the updated dynamic threat-level index for the corresponding local region is based at least in part on a previously determined updated dynamic threat-level index for the corresponding local region, as indicated at block 32a, but this is not required. In the example shown, the updated dynamic threat-level index for the corresponding local region is based at least in part on at least some of the received static data for the corresponding local region, as indicated at block 32b. The updated dynamic threat-level index for the corresponding local region is based at least in part on at least some of the received live data for the corresponding local region, as indicated at block 32c. The illustrative method 24 further includes displaying a dashboard that dynamically shows the updated dynamic threat-level index for each of at least some of the plurality of local regions, as indicated at block 34. In some cases, the updated dynamic threat-level index may be based at least in part upon one or more of an updated crime safety index, an updated traffic safety index and an updated health safety index, which may each be based at least in part on at least some of the received static data for the corresponding local region and at least some of the received dynamic data for the corresponding local region.

Figure 3:
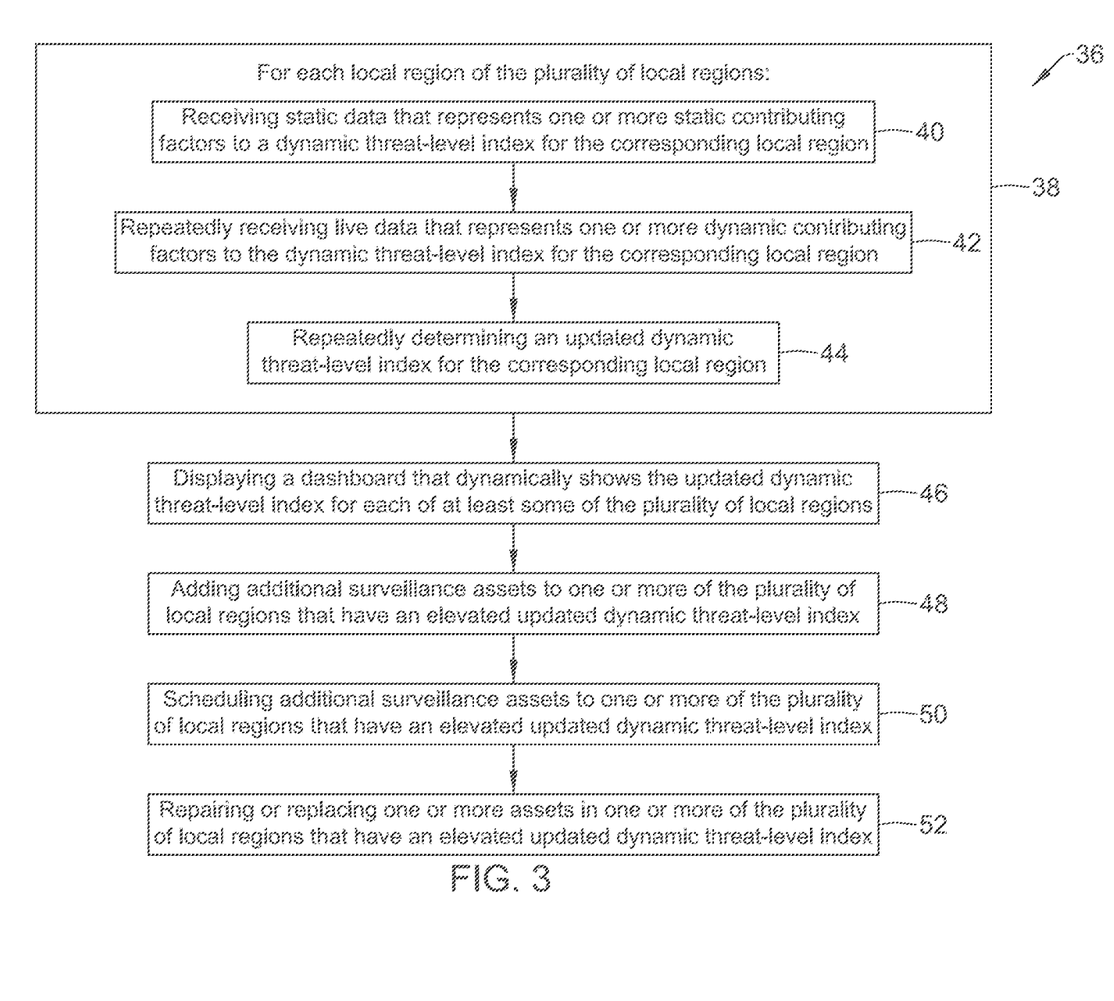
FIG. 3 is a flow diagram showing an illustrative method for improving surveillance within a city.

FIG. 3 is a flow diagram showing an illustrative method 36 for improving surveillance within a city that includes a plurality of local regions. The illustrative method 36 includes carrying out a number of steps for each local region of the plurality of regions, as indicated at block 38. The number of steps for each local region include receiving static data that represents one or more static contributing factors to a dynamic threat-level index for the corresponding local region, as indicated at block 40. The number of steps for each local region include repeatedly receiving live data that represents one or more dynamic contributing factors to the dynamic threat-level index for the corresponding local region, as indicated at block 42.

The number of steps for each local region include repeatedly determining an updated dynamic threat-level index for the corresponding local region, as indicated at block 44. The updated dynamic threat-level index for the corresponding local region may be based at least in part on a previously determined updated dynamic threat-level index for the corresponding local region. The updated dynamic threat-level index for the corresponding local region may be based at least in part on at least some of the received static data for the corresponding local region. The updated dynamic threat-level index for the corresponding local region may be based at least in part on at least some of the received live data for the corresponding local region. The illustrative method 36 includes displaying a dashboard that dynamically shows the updated dynamic threat-level index for each of at least some of the plurality of local regions, as indicated at block 46. In some cases, the updated dynamic threat-level index may be based at least in part upon one or more of an updated crime safety index, an updated traffic safety index and an updated health safety index.

In some instances, the illustrative method 36 may further include adding additional surveillance assets to one or more of the plurality of local regions that have an elevated updated dynamic threat-level index, as indicated at block 48. The additional surveillance assets that are added to one or more of the plurality of local regions may include a surveillance camera, for example. The method 36 may further include scheduling additional law enforcement assets to one or more of the plurality of local regions that have an elevated updated dynamic threat-level index, as indicated at block 50. In some cases, the method 36 may include repairing or replacing one or more assets in one or more of the plurality of local regions that have an elevated updated dynamic threat-level index.

In some cases, the static data may be updated at a rate of once per month or less often, and may include, for example, one or more of demographic data for the corresponding local region, literacy data for the corresponding local region, migrant data for the corresponding local region, population density data for the corresponding local region, employment data for the corresponding local region, income data for the corresponding local region, historical crime rate data for the corresponding local region, traffic law compliance data for the corresponding local region, traffic incident data for the corresponding local region, average traffic density data for the corresponding local region, surveillance coverage data that provides a measure of surveillance coverage of the corresponding local region, pandemic/epidemic status for the corresponding local region and/or any other useful static data that has a correlation with a threat level in the corresponding local region. In some cases, the live data may be updated at a rate of once per day or more often, and may include, for example, one or more of weather data for the corresponding local region, traffic data for the corresponding local region, law enforcement asset data that provides a measure of law enforcement assets currently assigned to the corresponding local region, event data identifying one or more events currently identified in the corresponding local region, social media data relevant to the corresponding local region, environmental condition data identifying one or more environmental conditions currently detected in the corresponding local region and/or any other useful dynamic data that has a correlation with a threat level in the corresponding local region.

Figure 4:
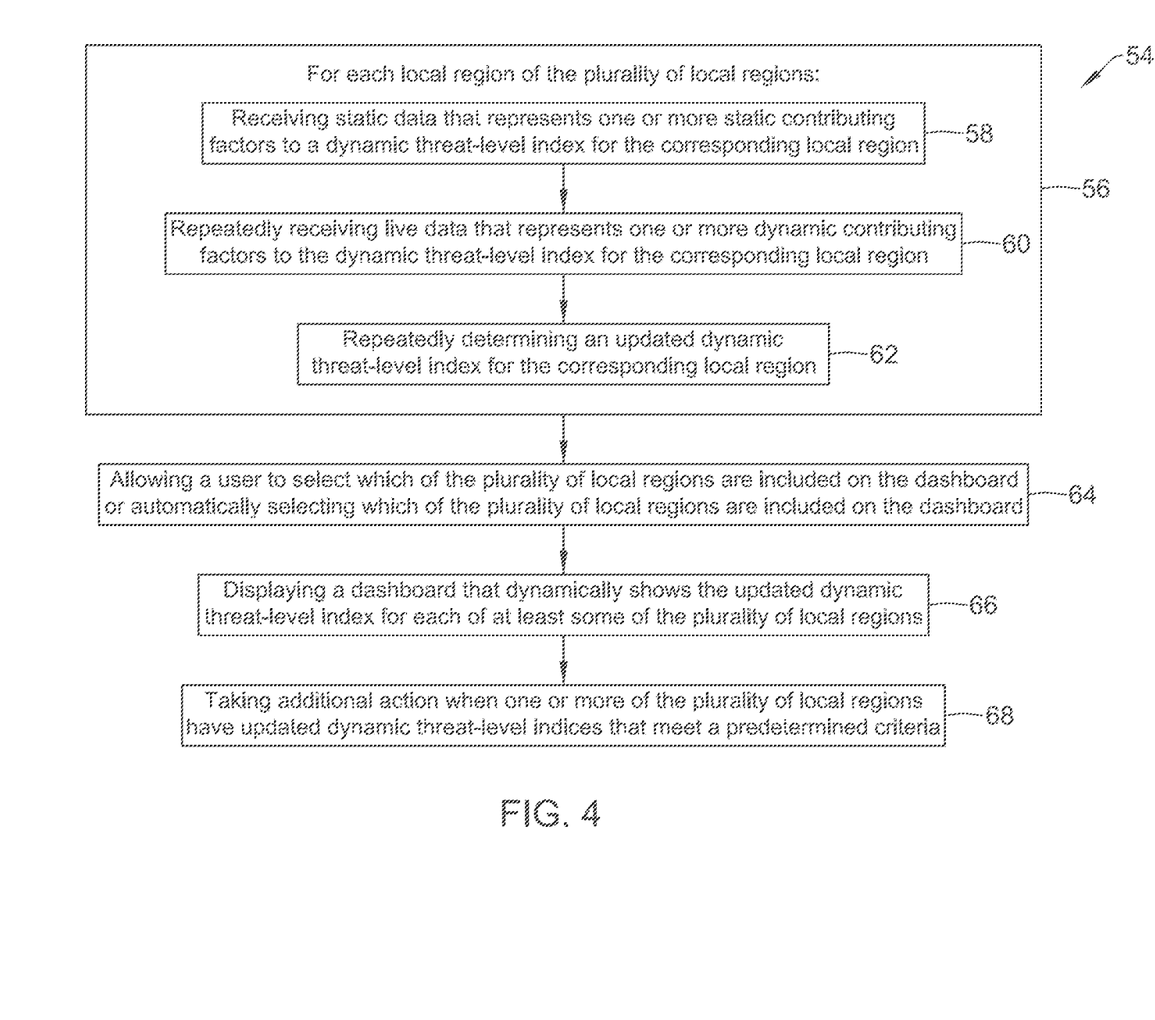
FIG. 4 is a flow diagram showing an illustrative method for improving surveillance within a city.

FIG. 4 is a flow diagram showing an illustrative method 54 for improving surveillance within a city that includes a plurality of local regions. The illustrative method 54 includes carrying out a number of steps for each local region of the plurality of regions, as indicated at block 56. The number of steps for each local region include receiving static data that represents one or more static contributing factors to a dynamic threat-level index for the corresponding local region, as indicated at block 58. The number of steps for each local region further include repeatedly receiving live data that represents one or more dynamic contributing factors to the dynamic threat-level index for the corresponding local region, as indicated at block 60.

The number of steps for each local region further include repeatedly determining an updated dynamic threat-level index for the corresponding local region, as indicated at block 62. The updated dynamic threat-level index for the corresponding local region may be based at least in part on a previously determined updated dynamic threat-level index for the corresponding local region. The updated dynamic threat-level index for the corresponding local region may be based at least in part on at least some of the received static data for the corresponding local region. The updated dynamic threat-level index for the corresponding local region may be based at least in part on at least some of the received live data for the corresponding local region.

The illustrative method 54 includes allowing a user to select which of the plurality of local regions are included in the dashboard, or, alternatively or additionally, the method 54 may include automatically selecting which of the plurality of regions are included in the dashboard, as indicated at block 64. Automatically selecting which of the plurality of local regions to include on the dashboard may include selecting the local regions that have updated dynamic threat-level indices that meet a predetermined criteria (e.g. exceed a predetermined level).

The illustrative method 54 includes displaying a dashboard that dynamically shows the updated dynamic threat-level index for each of at least some of the plurality of local regions, as indicated at block 46. In some cases, the updated dynamic threat-level index may be based at least in part upon one or more of an updated crime safety index, an updated traffic safety index and an updated health safety index, which may each be based at least in part on at least some of the received static data for the corresponding local region and at least some of the received dynamic data for the corresponding local region. For example, the crime safety index, or the updated crime safety index may be based at least in part upon one or more of a wealth index (average earnings per person), unemployment (percentage of unemployed people, a lack of surveillance (percentage of area that is covered with video surveillance), a literacy rate, a sex ratio (relative number of males and females), and a total number of migrants. The traffic safety index, or the updated traffic safety index, may be based upon one or more of traffic rule compliance and/or number of traffic incidents, an average traffic density, and law enforcement coverage (ability of the traffic police to cover an area). The health safety index, or the updated health safety index, may be based at least in part upon one or more of air pollution, weather, and occurrences of pandemics or epidemics. These are just examples. In some cases, displaying the dashboard may include displaying a heatmap that includes two or more of the local regions of the city, wherein the heatmap graphically depicts a severity level of the updated dynamic threat-level index for each of the two or more local regions of the city.

The illustrative method 54 may further include taking additional action when one or more of the plurality of local regions have updated dynamic threat-level indices that meet a predetermined criteria, as indicated at block 68. As an example, taking additional action may include ordering a change in deployment of at least some of a plurality of surveillance assets of the city.

Figure 5:
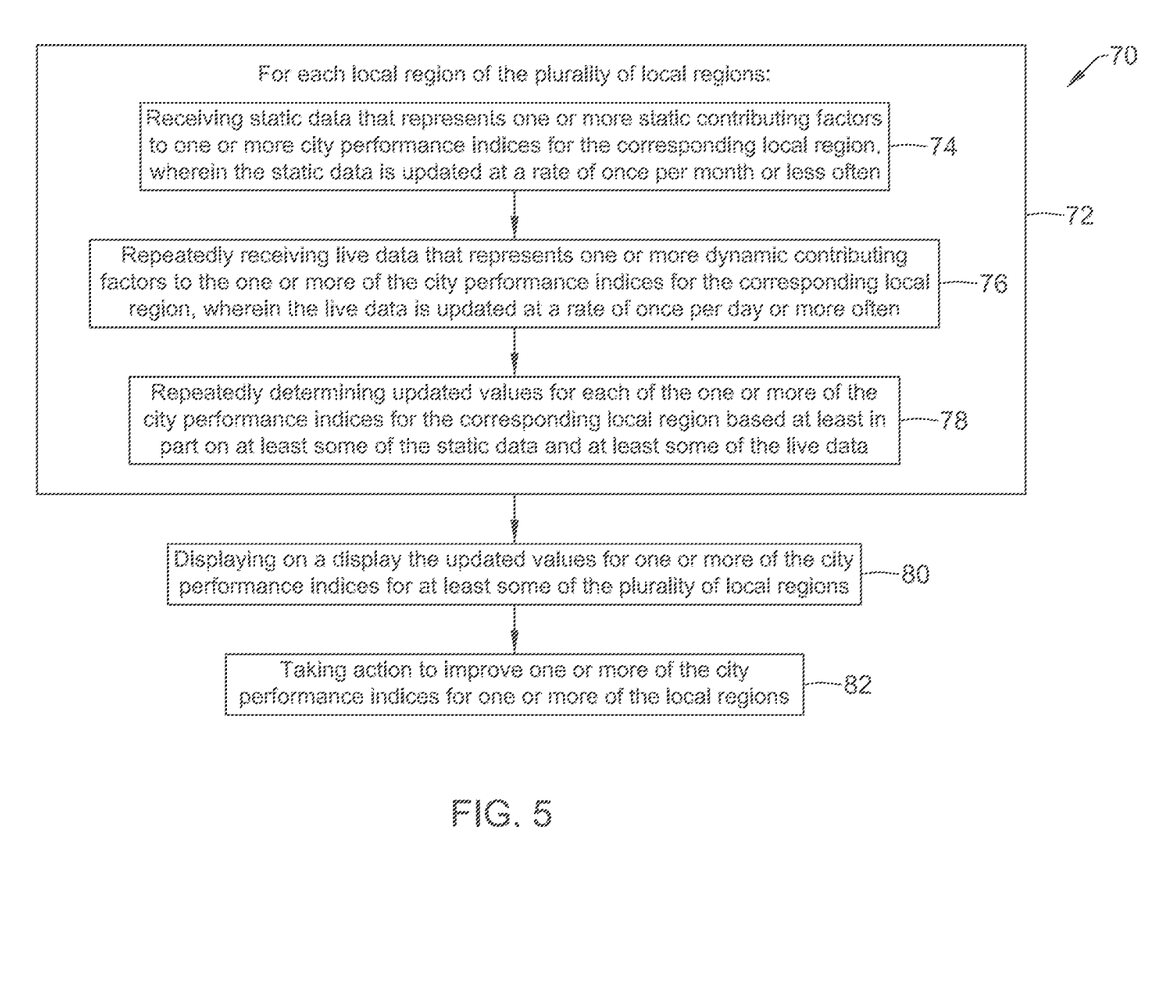
FIG. 5 is a flow diagram showing an illustrative method for improving surveillance within a city.

FIG. 5 is a flow diagram showing an illustrative method 70 for monitoring activity within a city that is divided into a plurality of local regions. The illustrative method 70 includes a number of steps for each local region of the plurality of local regions, as indicated at block 72. The number of steps for each local region include receiving static data that represents one or more static contributing factors to one or more city performance indices for the corresponding local region, wherein the static data is updated at a rate of once per month or less often, as indicated at block 74. The number of steps for each local region include repeatedly receiving live data that represents one or more dynamic contributing factors to the one or more of the city performance indices for the corresponding local region, wherein the live data is updated at a rate of once per day or more often, as indicated at block 76. The number of steps for each local region include repeatedly determining updated values for each of the one or more of the city performance indices for the corresponding local region based at least in part on at least some of the static data and at least some of the live data, as indicated at block 78. In some cases, the one or more city performance indices may include one or more of a crime safety index, a traffic safety index and a health safety index.

The illustrative method 70 includes displaying on a display the updated values for one or more of the city performance indices for at least some of the plurality of local regions, as indicated at block 80. The illustrative method 70 may also include taking action to improve one or more of the city performance indices for one or more of the local regions, as indicated at block 82.

Figure 6:
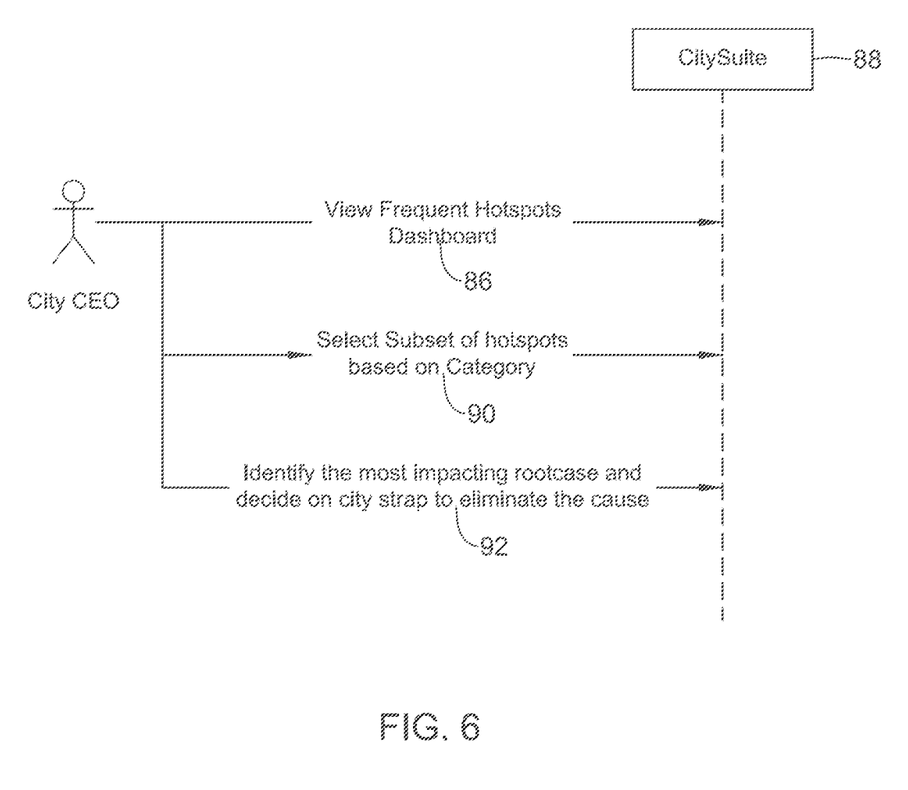
FIG. 6 is a flow diagram showing an illustrative workflow for a city executive.

FIG. 6 is a flow diagram showing an illustrative workflow 84 that may be carried out by a city executive, such as a City CEO, for example. The city executive may view frequent hotspots on the dashboard, as indicated at block 86. The dashboard may be provided as part of a City/Suite software program 88. In some cases, the system 10 described with respect to FIG. 1 may be considered as being part of the City/Suite software program 88. The city executive may select a subset of hotspots, sometimes based perhaps on a particular category (e.g. health, safety, crime), as indicated at 90. In some cases, the city executive may identify a root cause of the problem and may direct city resources to address/resolve the root cause, as indicated at 92.

Figure 7:
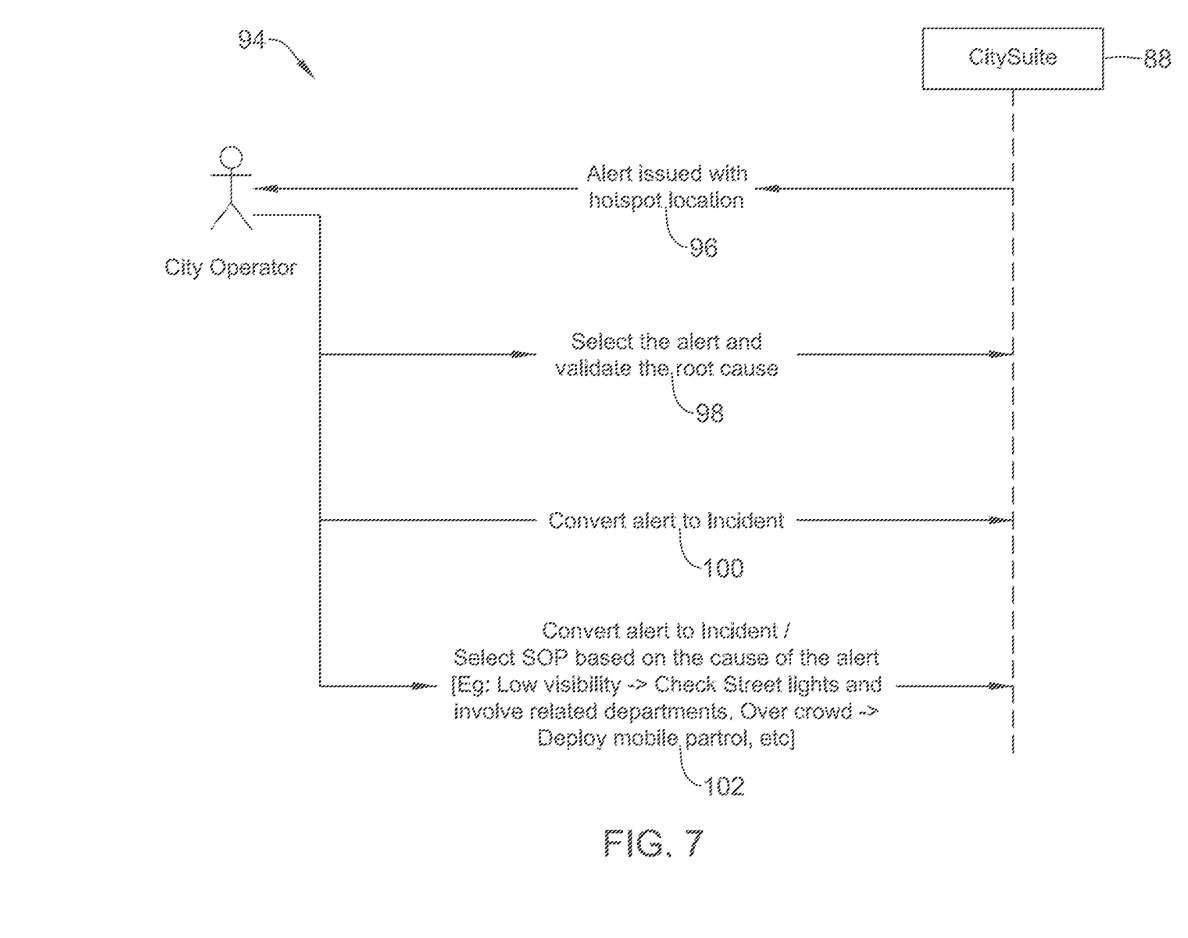
FIG. 7 is a flow diagram showing an illustrative workflow for a city security operator.

FIG. 7 is a flow diagram showing an illustrative workflow 94 that may be carried out by a city operator, such as a security system operator or a monitoring system operator. The city operator may receive an alert that identifies a hotspot location, as indicated at 96. The city operator may select the alert and validate a root cause of the alert, as indicated at 98. The city operator may convert the alert to an incident, as indicated at 100. The city operator may select an SOP (standard operating procedure) based on the root cause (s) of the alert, as indicated at 102.

Figure 8:
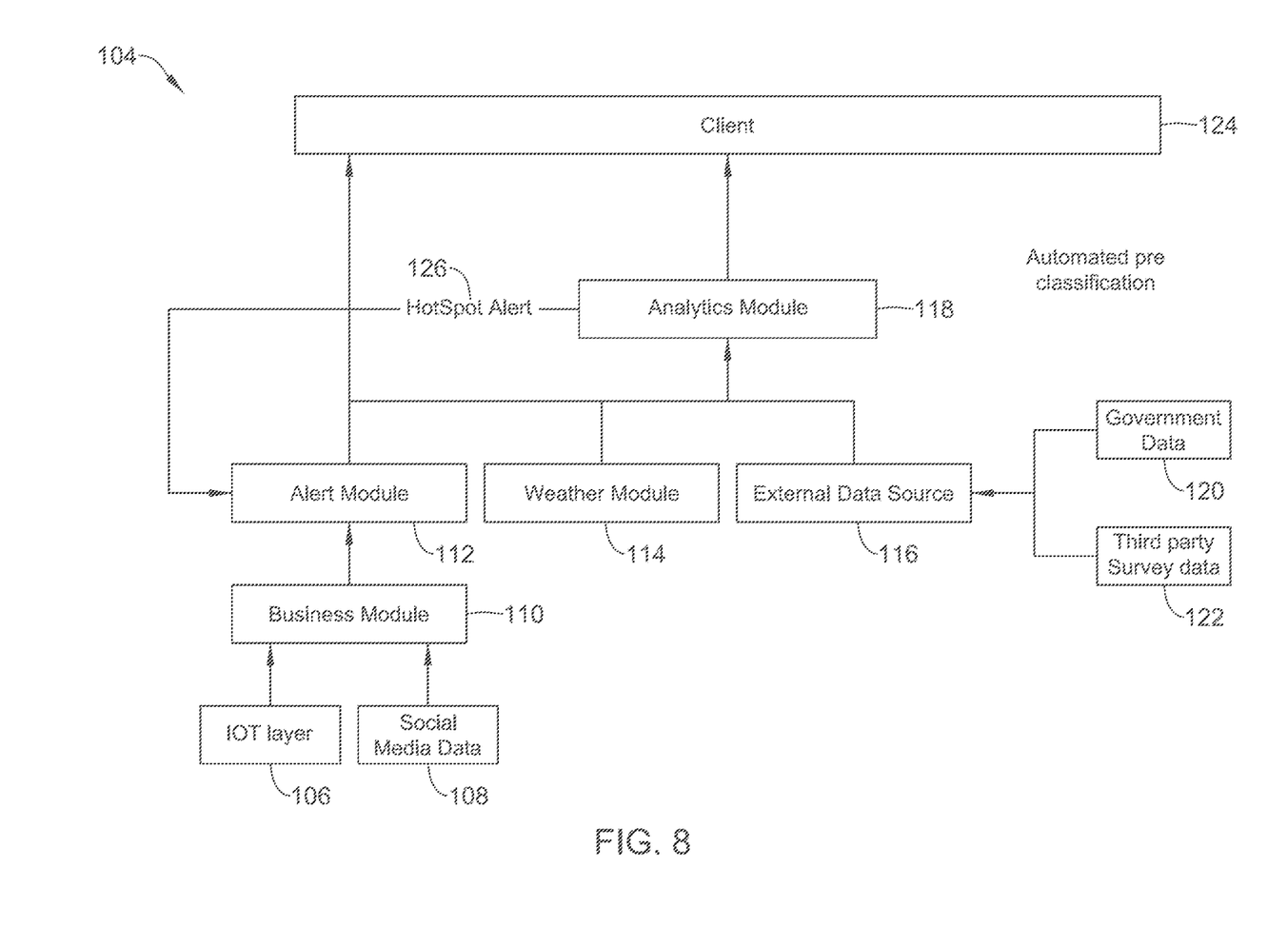
FIG. 8 is a flow diagram showing an illustrative method.

FIG. 8 is a flow diagram showing an illustrative method 104. In the example method, information may flow from an IOT (Internet of Things) layer 106 and a Social Media Data source 108 to a Business Module 110. From the Business Module 110, information flows to an Alert Module 112. Information from the Alert Module 112, along with information from a Weather Module 114 and an External Data Source 116, flow to an Analytics Module 118. The External Data Source 116 receives data from a Government Data source 120 and from a Third Party Survey Data source 122. The Government Data source 120 and/or the Third Party Survey Data source 122 may source at least some static data, and the IOT layer 106, Social Media Data source 108 and/or Weather Module 114 may source at least some Live data. The Analytics Module 118 provides information to a Client 124. The Client 124 also receives Hotspot Alerts 126 from the Alert Module 112.

Figure 9:
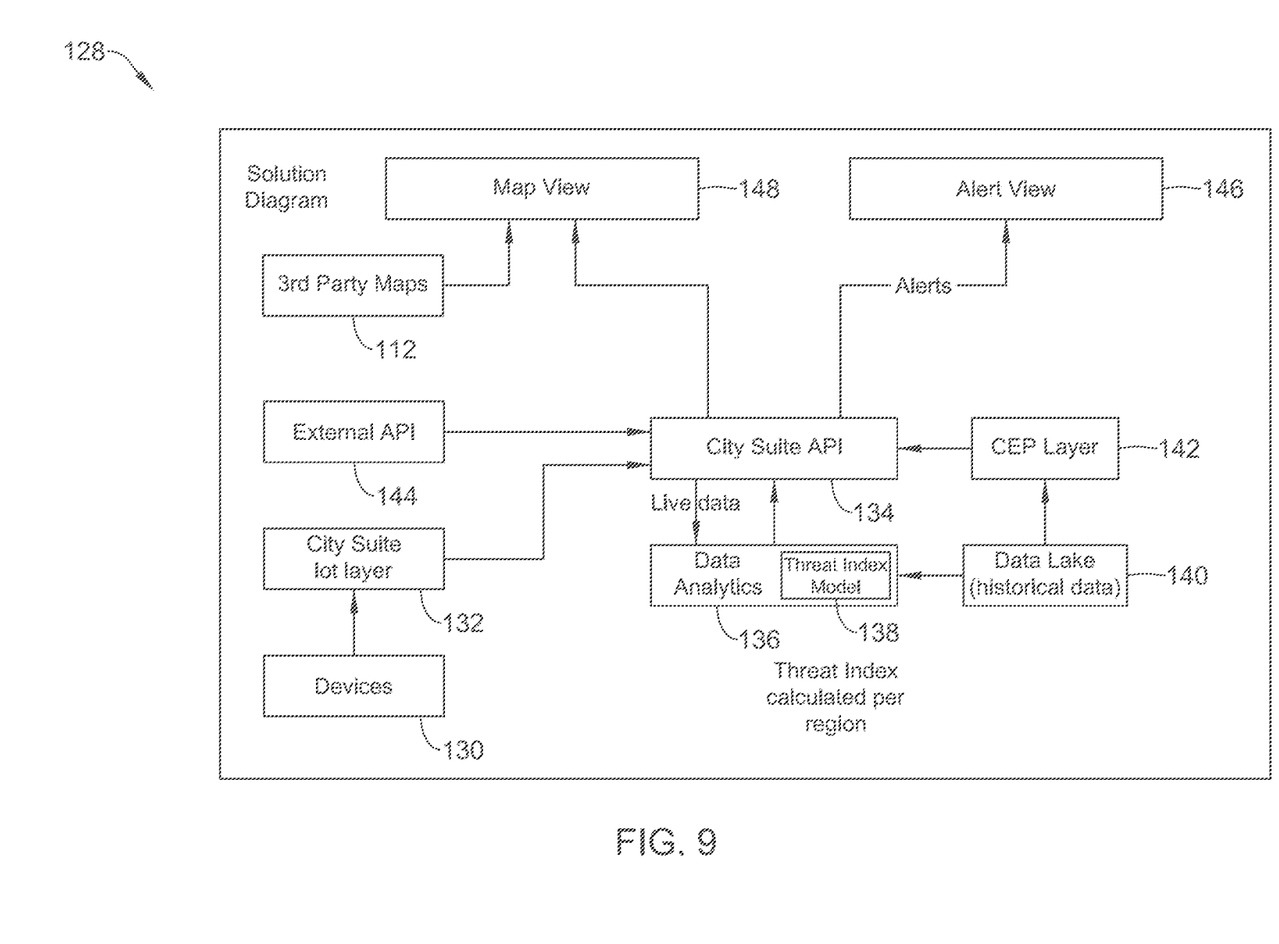
FIG. 9 is a flow diagram showing an illustrative method.

FIG. 9 is a flow diagram showing an illustrative method 128. Devices 130 report to a City/Suite IOT layer 132, which itself reports to a City/Suite API (Application Programming Interface) 134. The devices 130 may source at least some live data. A Data Analytics block 136, which includes a Threat Index model 138, also reports to the City/Suite API 134. A Data Lake 140, which includes historical data, provides information to the Data Analytics block 136 and also provides information to a CEP (Complex Event Processing) layer 142 that in turn provides information to the City/Suite API 134. The Data Lake 140 may source at least some static data. An External API 144 also provides information to the City/Suite API 134. The external API 144 may source at least some static data and/or at least some live data. The City/Suite API 134 provides alerts to an Alert View block 146. A Map View block 148 receives information from the City/Suite API 134 as well as from a 3$^{rd}$ Party Maps block 150. Information from the Alert View block 146 and the Map View block 148 may be displayed on a dashboard, for example. In some cases, the alerts may be displayed on a third party map showing the location/region of the alert.

Figure 10:
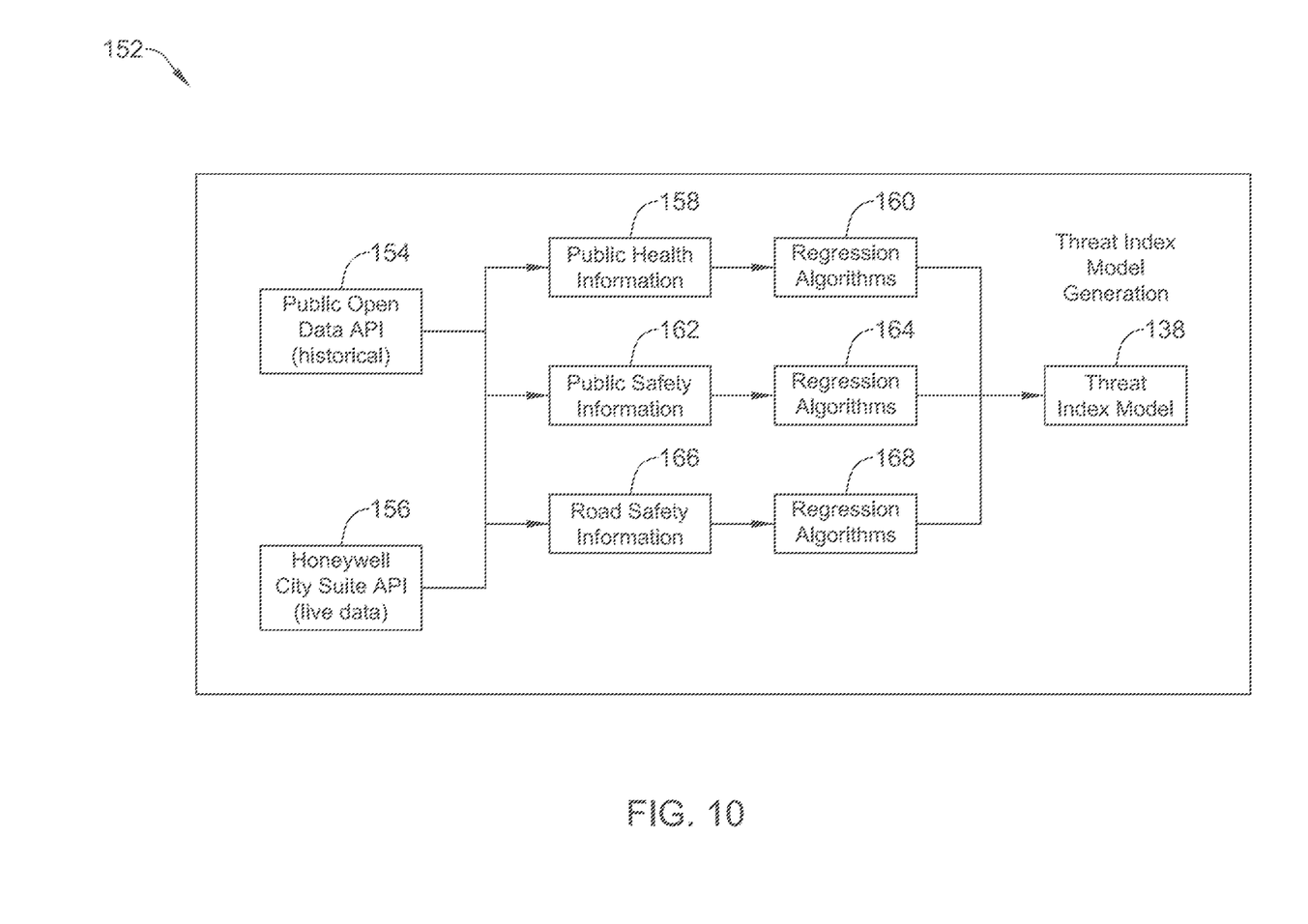
FIG. 10 is a schematic block diagram showing an illustrative workflow for generating a threat level index.

FIG. 10 is a schematic block diagram showing an illustrative workflow 152 that may be used to generate a Threat Index model 138. A Public Open Data API 154 provides historical data (e.g. static data) and a City/Suite API provides live data. The historical data and the live data are provided to a Public Health Information block 158, which provides relevant information to a set of regression algorithms 160. The historical data and the live data are provided to a Public Safety Information block 162, which provides relevant information to a set of regression algorithms 164. The historical data and the live data are provided to a Road Safety Information block 166, which provides relevant information, optionally in the form of text, to a set of regression algorithms 168. Each of the sets of regression algorithms 160, 164 and 168 provide outputs that together form the Threat Index Model 138. In some cases, the sets of regression algorithms 160, 164 and 168 provide outputs that together are used to generate the Threat Index Model 138. In some cases, the Threat Index Model 138 provide a predicted change of a threat index in a corresponding region at some time into the future. In some cases, the Threat Index Model 138 used a Machine Learning (ML) model to refine the threat index over time.

Figure 11A:
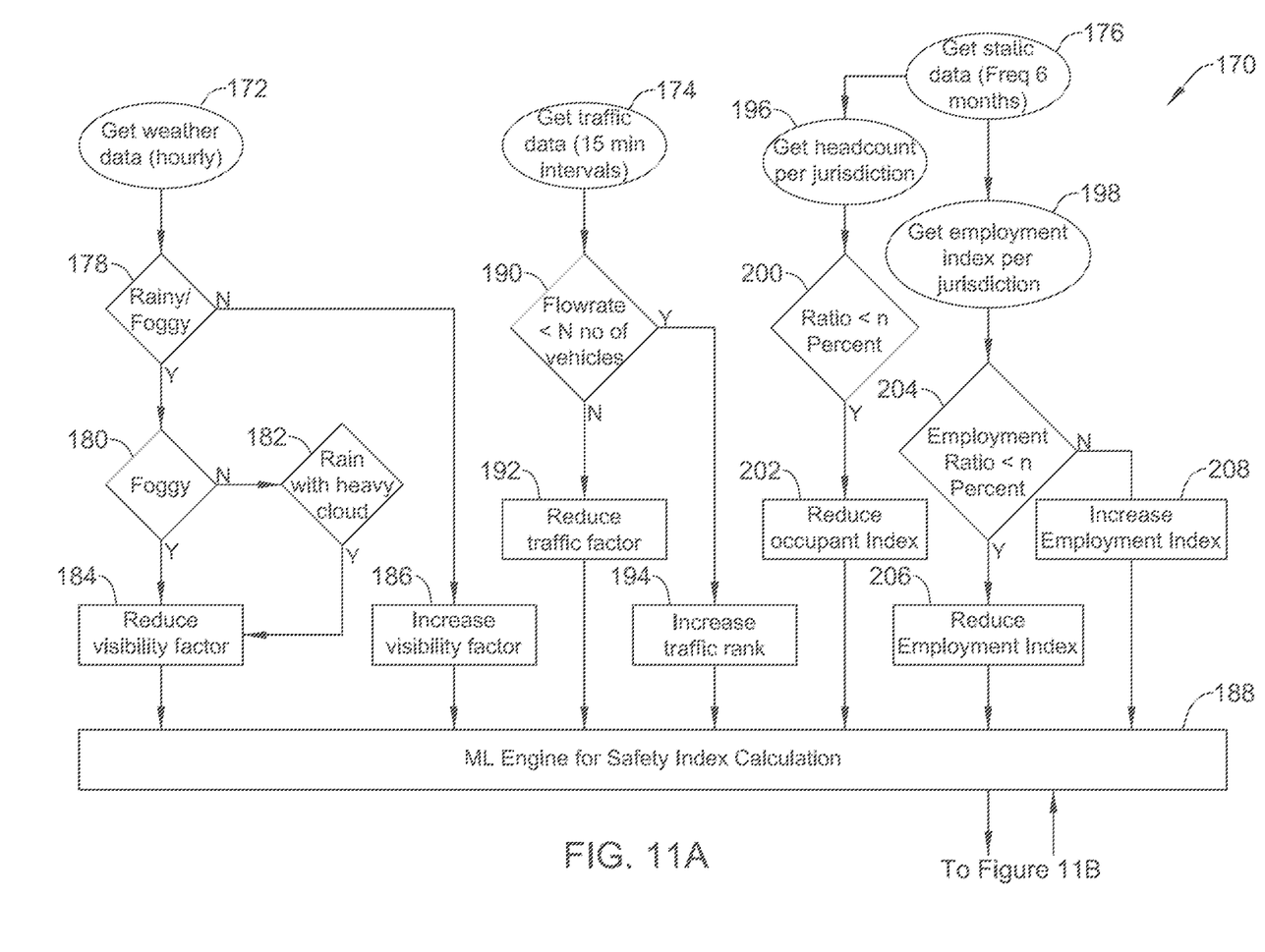
FIGS. 11A and 11B are flow diagrams that together show an illustrative method.
Figure 11B:
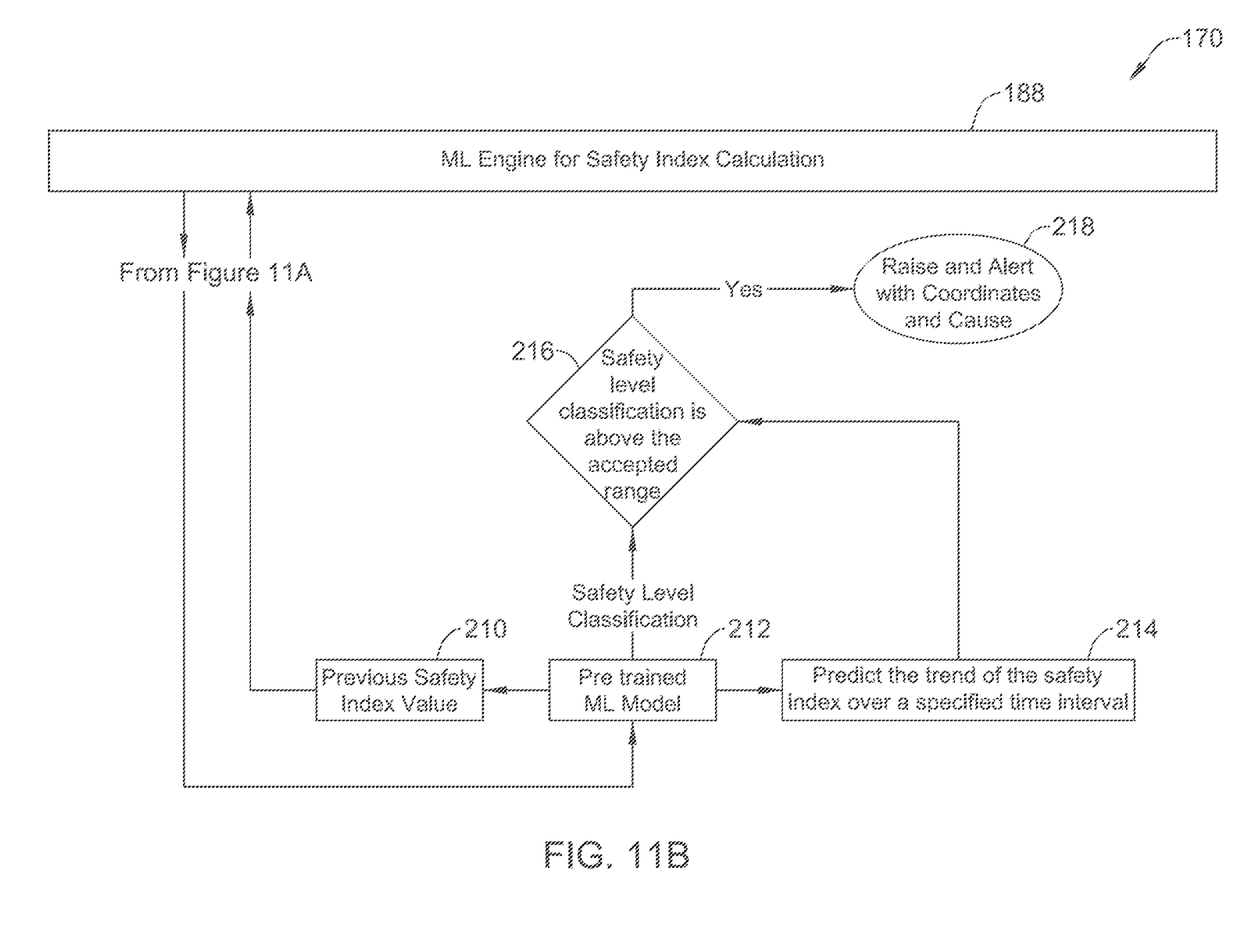

FIGS. 11A and 11B are flow diagrams that together show an illustrative method 170. The illustrative method 170 includes obtaining hourly weather data, as indicated at block 172, and obtaining traffic data, as indicated at block 174. The illustrative method 170 also includes obtaining static data, as indicated at block 176. Starting with the weather data (block 172), control passes to a decision block 178, where a determination is made as to whether the weather is either rainy or foggy. At decision block 180, a determination is made as to whether it is currently foggy. If so, control passes to block 184 and the visibility factor is reduced. If not foggy, control passes decision block 182 and a determination is made as to whether it is raining, with heavy clouds. If so, control passes again to block 184 and the visibility factor is reduced. If at decision block 178 the determination is made that it is neither foggy nor rainy, control passes to block 186 and the visibility factor is increased. The visibility factor is reported in either case to an ML (machine learning) engine 188 that calculates a safety index.

Starting with the traffic data (block 174), control passes to a decision block 190, where a determination is made as to whether the current vehicle flow rate is above a threshold. If not, control passes to block 192 and the traffic factor is reduced. If so, control passes to block 194 and the traffic factor is increased. The traffic factor is reported in either case to the ML engine 188.

Starting with the static data (block 176), control passes in parallel paths to a block 196 where the headcount per jurisdiction is obtained, and a block 198 where the employment per jurisdiction is obtained. At a decision block 200, a determination is made as to whether the headcount is below a threshold. If so, control passes to a block 202 and the occupant index is reduced. At a decision block 204, a determination is made as to whether the unemployment rate is below a threshold. If so, control passes to a block 206 and the employment index is reduced. If not, control passes to a block 208 and the employment index is increased. In either case, the employment index is reported to the ML engine 188.

Continuing on FIG. 11B, the previous safety index, as indicated at block 210, is reported to the ML engine 188 and may be a factor in calculating an updated safety index. The ML engine 188 also reports to a pretrained ML model, as indicated as block 212. The pretrained ML model 212 reports to a prediction block 214. From the pretrained ML model 212 and the prediction block 214, control passes to a decision block 216, where a determination is made as to whether the safety level classification is above an accepted range. If so, control passes to block 218 and an alert is raised.

Having thus described several illustrative embodiments of the present disclosure, those of skill in the art will readily appreciate that yet other embodiments may be made and used within the scope of the claims hereto attached. It will be understood, however, that this disclosure is, in many respects, only illustrative. Changes may be made in details, particularly in matters of shape, size, arrangement of parts, and exclusion and order of steps, without exceeding the scope of the disclosure. The disclosure's scope is, of course, defined in the language in which the appended claims are expressed.

What is claimed is:

1. A method for improving surveillance within a city, wherein the city includes a plurality of local regions, the method comprising:
   for each local region of the plurality of local regions:
      receiving static data that represents one or more static contributing factors to a dynamic threat-level index for the corresponding local region;
      repeatedly receiving live data that represents one or more dynamic contributing factors to the dynamic threat-level index for the corresponding local region;
      repeatedly determining an updated dynamic threat-level index for the corresponding local region, wherein the updated dynamic threat-level index for the corresponding local region is based at least in part on:
         a previously determined updated dynamic threat-level index for the corresponding local region;
         at least some of the received static data for the corresponding local region;
         at least some of the received live data for the corresponding local region;
      wherein the updated dynamic threat-level index for the corresponding local region is based at least in part upon an updated crime safety index, an updated traffic safety index and an updated health safety index for the corresponding local region, wherein:
         the updated crime safety index is based at least in part on a wealth index for the corresponding local region and an unemployment index for the corresponding local region;
         the updated traffic safety index is based at least in part on a traffic incident index for the corresponding local region and a traffic density index for the corresponding local region;
         the updated health safety index is based at least in part on an air pollution index for the corresponding local region and a weather index for the corresponding local region;
   selecting one or more of the plurality of local regions to display; and
   displaying a dashboard that dynamically shows the updated dynamic threat-level index for the selected one or more of the plurality of local regions.

2. The method of claim 1, further comprising adding additional surveillance assets to one or more of the plurality of local regions that have an elevated updated dynamic threat-level index.

3. The method of claim 2, wherein the additional surveillance assets added to one or more of the plurality of local regions comprise a surveillance camera.

4. The method of claim 1, further comprising scheduling additional law enforcement assets to one or more of the plurality of local regions that have an elevated updated dynamic threat-level index.

5. The method of claim 1, further comprising repairing or replacing one or more assets in one or more of the plurality of local regions that have an elevated updated dynamic threat-level index.

6. The method of claim 1, wherein the static data is updated at a rate of once per month or less often.

7. The method of claim 1, wherein the updated crime safety index is also based at least in part on one or more of:
   demographic data for the corresponding local region;
   literacy data for the corresponding local region;
   migrant data for the corresponding local region;
   population density data for the corresponding local region;
   historical crime rate data for the corresponding local region; and
   surveillance coverage data that provides a measure of surveillance coverage of the corresponding local region.

8. The method of claim 1, wherein the live data is updated at a rate of once per day or more often.

9. The method of claim 8, wherein the updated crime safety index is also based at least in part on one or more of:
   law enforcement asset data that provides a measure of law enforcement assets currently assigned to the corresponding local region;
   event data identifying one or more events currently identified in the corresponding local region; and
   social media data relevant to the corresponding local region.

10. The method of claim 1, wherein selecting the one or more of the plurality of local regions to display comprises allowing a user to select which of the plurality of local regions are included on the dashboard.

11. The method of claim 1, wherein selecting the one or more of the plurality of local regions to display comprises automatically selecting which of the plurality of local regions are included on the dashboard.

12. The method of claim 11, wherein automatically selecting which of the plurality of local regions to include on the dashboard comprises selecting the local regions that have updated dynamic threat-level indices that meet a predetermined criteria.

13. The method of claim 1, further comprising taking additional action when one or more of the plurality of local regions have updated dynamic threat-level indices that meet a predetermined criteria.

14. The method of claim 13, wherein taking additional action comprises ordering a change in deployment of at least some of a plurality of surveillance assets of the city.

15. The method of claim 1, wherein displaying the dashboard includes displaying a heatmap that includes two or more of the local regions of the city, wherein the heatmap graphically depicts a severity level of the updated dynamic threat-level index for each of the two or more local regions of the city.

16. A method for monitoring activity within a city, wherein the city is divided into a plurality of local regions, the method comprising:
   for each local region of the plurality of local regions:
      receiving static data that represents one or more static contributing factors for each of a plurality of city performance indices for the corresponding local region, wherein the static data is updated at a rate of once per month or less often;
      repeatedly receiving live data that represents one or more dynamic contributing factors for each of the plurality of the city performance indices for the corresponding local region, wherein the live data is updated at a rate of once per day or more often;
      repeatedly determining updated values for each of the plurality of city performance indices for the corresponding local region based at least in part on at least some of the static data and at least some of the live data;

wherein the plurality of city performance indices for each of the corresponding local region include a crime safety index, a traffic safety index and a health safety index, wherein:

the crime safety index is based at least in part on a wealth index for the corresponding local region and an unemployment index for the corresponding local region;

the traffic safety index is based at least in part on a traffic incident index for the corresponding local region and a traffic density index for the corresponding local region;

the health safety index is based at least in part on an air pollution index for the corresponding local region and a weather index for the corresponding local region;

displaying on a display the updated values for one or more of the plurality of city performance indices for at least some of the plurality of local regions; and taking action to improve one or more of the plurality of city performance indices for one or more of the local regions.

17. A method for improving surveillance within a city, wherein the city includes a plurality of local regions, the method comprising:

for each local region of the plurality of local regions:

receiving static data that represents one or more static contributing factors to a dynamic threat-level index for the corresponding local region;

repeatedly receiving live data that represents one or more dynamic contributing factors to the dynamic threat-level index for the corresponding local region;

repeatedly determining an updated dynamic threat-level index for the corresponding local region, wherein the updated dynamic threat-level index for the corresponding local region is based at least in part on:

a previously determined updated dynamic threat-level index for the corresponding local region;

at least some of the received static data for the corresponding local region;

at least some of the received live data for the corresponding local region;

wherein the updated dynamic threat-level index for the corresponding local region is based at least in part upon an updated crime safety index, an updated traffic safety index and an updated health safety index for the corresponding local region, wherein:

the updated crime safety index is based at least in part on one or more of a wealth index for the corresponding local region and an unemployment index for the corresponding local region;

the updated traffic safety index is based at least in part on one or more of a traffic incident index for the corresponding local region and a traffic density index for the corresponding local region;

the updated health safety index is based at least in part on one or more of an air pollution index for the corresponding local region and a weather index for the corresponding local region;

soliciting from a user a selection of which of the plurality of local regions to display; and displaying a dashboard that dynamically shows the updated dynamic threat-level index for the plurality of local regions that were selected by the user.

* * * * *